(12) United States Patent
Sonntag et al.

(10) Patent No.: US 11,638,949 B2
(45) Date of Patent: May 2, 2023

(54) METHOD FOR PRODUCING A MULTILAYERED HEAT SHIELD

(71) Applicant: BENTELER AUTOMOBILTECHNIK GMBH, Paderborn (DE)

(72) Inventors: Carsten Sonntag, Salzkotten (DE); Tobias Dupmeier, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 49 days.

(21) Appl. No.: 17/364,945

(22) Filed: Jul. 1, 2021

(65) Prior Publication Data
US 2022/0001439 A1    Jan. 6, 2022

(30) Foreign Application Priority Data
Jul. 2, 2020    (DE) ..................... 10 2020 117 492.6

(51) Int. Cl.
*B21D 53/04*    (2006.01)
*B23P 15/26*    (2006.01)
(Continued)

(52) U.S. Cl.
CPC ........... *B21D 53/04* (2013.01); *B21D 39/021* (2013.01); *B23P 15/26* (2013.01); *B32B 3/04* (2013.01);
(Continued)

(58) Field of Classification Search
CPC ........ Y10T 29/49629; Y10T 29/49622; B21D 39/021; B21D 39/02; B21D 39/04; B23P 2700/50
See application file for complete search history.

(56) References Cited

U.S. PATENT DOCUMENTS 3,540,116 A * 11/1970 Bohnsack .................. E04C 2/28
                                                    29/430
4,719,689 A * 1/1988 Yamamoto ............. B60J 5/0469
                                                    29/458
(Continued)

FOREIGN PATENT DOCUMENTS

DE      202011106603 U1    10/2012
DE      112012006386 T5     2/2015
(Continued)

OTHER PUBLICATIONS

Extended European Search Report for European Application No. 21171876.2 dated Nov. 5, 2021; 10pp.
(Continued)

*Primary Examiner* — Jason L Vaughan
(74) *Attorney, Agent, or Firm* — Hauptman Ham, LLP

(57) ABSTRACT

In a method for producing a multilayered heat shield, which has a first metal layer and a second metal layer that has an insulating layer arranged between the metal layers, the metal layers are connected at the edge by a flanging. To produce the heat shield, the first metal layer, the insulating layer and the second metal layer are placed into a first pressing tool. This is effected in such a way that an edge portion of the first metal layer protrudes beyond an edge portion of the second metal layer. The insulating layer is set back from the edge portions of the first metal layer and of the second metal layer.

11 Claims, 2 Drawing Sheets

(51) Int. Cl.
    *B32B 3/04*          (2006.01)
    *B32B 3/06*          (2006.01)
    *B32B 7/08*          (2019.01)
    *B32B 37/10*        (2006.01)
    *B32B 37/18*        (2006.01)
    *B21D 39/02*        (2006.01)

(52) U.S. Cl.
    CPC ............... *B32B 3/06* (2013.01); *B32B 7/08* (2013.01); *B32B 37/10* (2013.01); *B32B 37/18* (2013.01); *B23P 2700/50* (2013.01); *B32B 2250/03* (2013.01); *B32B 2250/40* (2013.01); *B32B 2605/00* (2013.01); *Y10T 29/49622* (2015.01)

(56) References Cited

U.S. PATENT DOCUMENTS

| | | | |
|---|---|---|---|
| 5,309,622 A | | 5/1994 | Pirchl |
| 5,634,251 A | * | 6/1997 | Kraft ................... B21D 39/021 29/890 |
| 5,953,808 A | | 9/1999 | Schenck, Jr. et al. |
| 6,052,887 A | * | 4/2000 | Dziadosz ............. B21D 39/021 72/313 |
| 6,109,682 A | * | 8/2000 | Zimmer ............... B21D 39/021 219/121.63 |
| 6,848,160 B1 | * | 2/2005 | Cota, Jr. ............... B21D 51/04 428/68 |
| 9,427,791 B2 | * | 8/2016 | Okunaka ............... B21D 19/12 |
| 9,452,462 B2 | * | 9/2016 | Elgimiabi ................. C09J 5/06 |
| 9,586,638 B2 | * | 3/2017 | Huhn .................... B21D 53/88 |
| 2007/0080194 A1 | | 4/2007 | Duckek et al. |
| 2011/0156444 A1 | * | 6/2011 | Tao ........................ B21D 19/12 29/505 |
| 2012/0248811 A1 | * | 10/2012 | Song ........................ B24B 9/00 296/76 |
| 2013/0113237 A1 | * | 5/2013 | Huhn ...................... B62D 25/04 296/193.06 |
| 2015/0068021 A1 | | 3/2015 | Cui |

FOREIGN PATENT DOCUMENTS

| | | | | |
|---|---|---|---|---|
| EP | 1775437 A1 | | 4/2007 | |
| JP | 07101356 A | * | 4/1995 | ............. B62D 25/10 |
| KR | 20100028349 A | | 3/2010 | |
| WO | 2016193447 A1 | | 12/2016 | |

OTHER PUBLICATIONS

Office Action for German Application No. 10 2020 117 492.6 dated Jun. 1, 2021; 10pp.

* cited by examiner

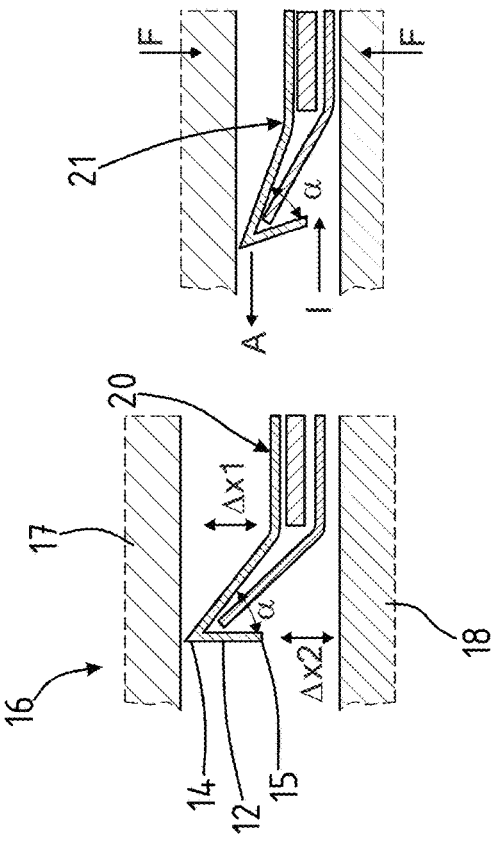

METHOD FOR PRODUCING A MULTILAYERED HEAT SHIELD

RELATED APPLICATION(S)

The present application claims priority of German Application Number 10 2020 117 492.6 filed Jul. 2, 2020, the disclosure of which is hereby incorporated by reference herein in its entirety.

FIELD

The disclosure relates to a method for producing a multilayered heat shield.

BACKGROUND

Heat shields are used in various applications on motor vehicles, in order to prevent or reduce the transmission of heat to or from certain areas. In motor vehicles, heat shields are predominantly but not exclusively used in areas where hot components, such as exhaust system components or engine components, are arranged adjacent to heat-sensitive components, units or areas. The use of heat shields between passenger compartment and exhaust systems of a motor vehicle is also customary, in order to reduce the heat transmission from the engine and from exhaust components.

DE 20 2011 106 603 U1 relates to a multilayered heat shield, in which the metal layers are connected at the edges by a flanging.

EP 1 775 437 A1 also discloses a heat shield having a first and a second metal layer, which are connected to one another in that an outer edge portion of the first metal layer is flanged onto the second metal layer substantially around the entire periphery of the outer edge of the second metal layer. In addition, at least a partial region of the outer edge portion is welded to the second metal layer and then the first and second metal layers are three-dimensionally deformed.

Heat shields of known design have a first metal layer and a second metal layer with an insulating layer arranged between the metal layers. For production, generally a sandwich is produced with the two external metal layers and the internal insulating material. The production is effected in a plurality of process steps. In this respect, a first metal layer is deep drawn, in order to create a 90° folded edge around the periphery. Subsequently, the insulating layer and then the second metal layer is positioned. In the next step, the folded edge around the periphery is repositioned using a tool, with the result that the metal layers are connected at the edge by a flanging. After this, in a further method step, the folded edge is pushed closed between two flat plates.

The disclosure is based on the object of providing a more economic configuration of a method for producing a multilayered heat shield and reducing the necessary manufacturing steps for connecting the at least two metal layers at the edge.

SUMMARY

A method for producing a multilayered heat shield which has a first metal layer and a second metal layer having an insulating layer arranged between the metal layers and the metal layers are connected at the edge by a flanging, provides the following procedure:

The first metal layer, the insulating layer and the second metal layer are placed into a first pressing tool. For this purpose, it is possible beforehand for a sandwich, which is placed into the first pressing tool, to be formed from the first metal layer, the insulating layer and the second metal layer. The sandwich may be formed in the first pressing tool from the first metal layer, the insulating layer and the second metal layer. The arrangement of the first metal layer, the insulating layer and the second metal layer in the first pressing tool is effected in such a way that an edge portion of the first metal layer protrudes beyond an edge portion of the second metal layer, and the insulating layer is set back from the edge portions of the first metal layer and of the second metal layer;

Then, a forming of the edge portion of the first metal layer and the edge portion of the second metal layer relative to the horizontal plane of the insulating layer is effected, wherein the edge portion of the first metal layer and the edge portion of the second metal layer are bent over together in one direction and a protruding limb of the edge portion of the first metal layer is repositioned counter to the forming direction to afford a standing seam, which has a folded end and a free end;

The sandwich is then transferred to a second pressing tool and received there between an upper tool and a lower tool, and the pressing tool is closed, wherein the upper tool and the lower tool are moved toward one another and, during the closing movement, the upper tool comes into contact with the folded end of the standing seam before the free end of the standing seam comes into contact with the lower tool, and the standing seam of the edge portion of the first metal layer is flanged to form a hem around the edge portion of the second metal layer.

The joining of the first metal layer and the second metal layer to the insulating layer received in between is effected in two pressing tools in a two-stage process. The economic configuration of the manufacturing process makes it possible to omit a pressing and/or forming tool. The previously customary three manufacturing steps for producing the heat shield are reduced to two manufacturing steps.

The metal layers are metallic foils with a thickness of approx. 0.2 mm. The metal layers may have steel and other heat-resistant metals, including lightweight metals. The insulating layer has insulating material with a thickness of approx. 0.8 mm. This may be an organic fiber material and/or fiber paper or the like, or a heat insulating material formed as layers.

To produce the heat shield, a sandwich is formed from the first metal layer, the insulating layer and the second metal layer. This is effected in the first pressing tool. All layers are held in the pressing tool by means of positioning aids. Positioning aids may be formed by positioning pins, for example. The formation and holding of the sandwich is effected by means of positioning aids in the lower tool. Positioning aids may, however, also be formed by the layers themselves, for example, in that the three components, that is to say the first metal layer, the insulating layer and the second metal layer, are connected by a clinch, for example. Of course, it is possible also to position the individual layers in a force-fitting manner between upper tool and lower tool.

The first metal layer has larger dimensions than the second metal layer. The first metal layer thus has a greater dimension over its surface area. The positioning in the first pressing tool is effected in such a way that an edge portion of the first metal layer protrudes beyond an edge portion of the second metal layer. The insulating layer is dimensioned and the arrangement thereof between the two metal layers is carried out such that the insulating layer and/or the edge of the insulating layer is set back from the edge portions of the first metal layer and the second metal layer. The insulating layer has a surface area which is smaller than the surface area of the second metal layer. The surface area of the second metal layer is in turn smaller than the surface area of the first metal layer.

The first forming step then provides that the edge portion of the first metal layer and the edge portion of the second metal layer are formed relative to the horizontal plane of the insulating layer, wherein the edge portion of the first metal layer and the edge portion of the second metal layer are bent over together in one direction. In this forming process, the edge portion of the first metal layer is formed in a mold receptacle of the pressing tool in such a way that a protruding limb of the edge portion of the first metal layer is repositioned counter to the forming direction to afford a standing seam. This standing seam has a folded end at the transition from the edge portion to the standing seam and also a free end. Folded end means that the standing seam is repositioned with a comparatively sharp bend.

Subsequently, the sandwich composed of first metal layer and second metal layer with insulating layer arranged in between is transferred to a second pressing tool and received there between an upper tool a lower tool. The second pressing tool is then closed, wherein the upper tool and the lower tool are moved relative to one another and/or towards one another. During the closing movement, the upper tool comes into contact with the folded end of the standing seam, specifically before the free end of the standing seam comes into contact with the lower tool. Owing to the downward movement and the lever action, in which the folded end is braced against the wall of the upper tool and moved outward relative thereto, the free end of the standing seam is moved and/or bent downward and inward in the direction of the insulating layer. By means of the closing of the second pressing tool, the standing seam is placed around the edge portion of the second metal layer and is flanged to form a hem. The upper edge portion of the first metal layer and the standing seam lying therebelow then run approximately parallel to one another. The edge portion of the second metal layer is received between the edge portion of the first metal layer and the standing seam.

The manufacture requires only two pressing tools and two manufacturing steps.

In the first pressing tool, the standing seam is repositioned in such a way that an acute angle, which is less than or equal to (≥) 50°, is formed between the standing seam and the edge portion of the first metal layer. With the arrangement of the standing seam in the pressing tool, the contact at a first contact point leads to a rotational movement of the folded end in such a way that the free end moves inward. This procedure assists the flanging operation and ensures that in the next manufacturing step the standing seam is reliably moved inward toward the insulating layer, whereas the folded end of the standing seam moves outward relatively away from the insulating layer.

The free end of the edge portion of the second metal layer is received between the standing seam and the edge portion of the first metal layer. After the repositioning of the protruding limb of the edge portion of the first metal layer in the first pressing tool, the free end of the edge portion of the second metal layer is received between the edge portion of the first metal layer and the standing seam.

During the closing movement of the second pressing tool, the folded end of the standing seam moves outward relative to the insulating layer, that is to say away from the insulating layer, whereas the free end of the standing seam moves inward relative to the insulating layer, that is to say in the direction of the insulating layer.

BRIEF DESCRIPTION OF THE DRAWINGS

The disclosure is described in more detail below with reference to drawings, in which:

FIG. 1 and FIG. 2 show a detail of a first pressing tool with the depiction of two manufacturing situations and FIG. 3 to FIG. 6 show a detail of a second pressing tool with the depiction of the manufacturing sequence for the peripheral connection of the metal layers of a heat shield during production thereof.

DETAILED DESCRIPTION

Figure 1:
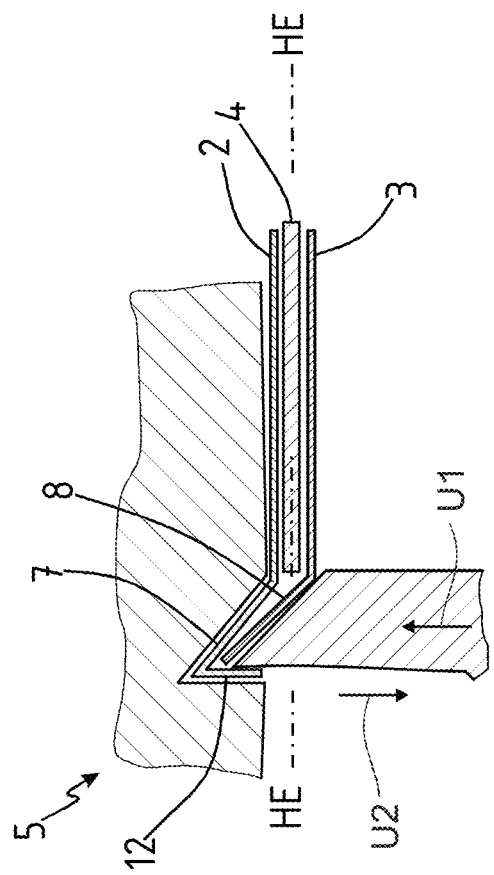

The production of a multilayered heat shield 1 is described in various production phases with reference to FIG. 1 to FIG. 6. The depictions are schematically and technically simplified and are not to be understood as true to scale.

A multilayered heat shield 1 produced according to the disclosure (see FIG. 6 in this respect) has a first metal layer 2 and a second metal layer 3 with an insulating layer 4 arranged between the metal layers 2, 3. The first metal layer 2 and the second metal layer 3 are connected at the edge by a flanging. This is effected around the periphery, or in an encircling manner around the entire periphery of the heat shield 1.

To produce the multilayered heat shield 1, a first metal layer 2 and a second metal layer 3 and also an insulating layer 4 are provided. The first metal layer 2 and the second metal layer 3 are metal foils with a thickness of approx. 0.2 mm. The insulating layer 4 has insulating and/or heat protection material, for example an organic fiber paper, and has a thickness of approx. 0.8 mm.

The insulating layer 4 has a surface area in its horizontal extent. Said surface area has smaller dimensions than the surface area of the second metal layer 3. The size of the surface of the second metal layer 3 in turn has smaller dimensions than the surface area of the first metal layer 2.

Figure 2:
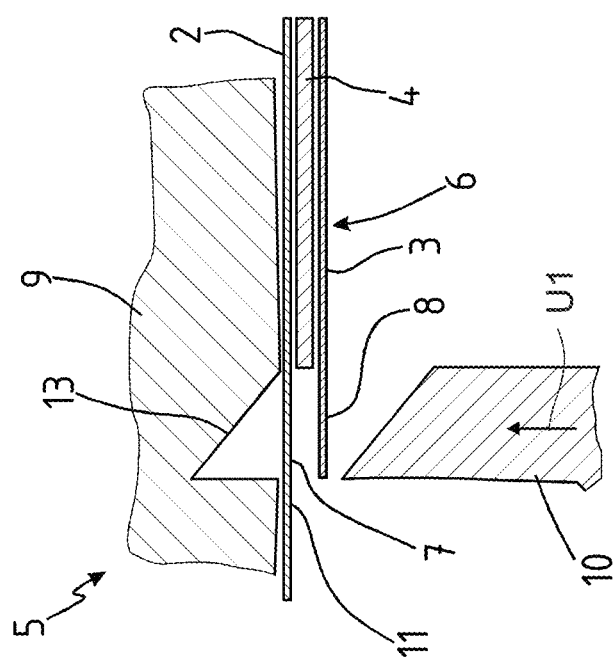

The first metal layer 2, the insulating layer 4 and the second metal layer 3 are placed into a first pressing tool 5 (FIG. 1 and FIG. 2). The sandwich 6 formed from the first metal layer 2, the insulating layer 4 and the second metal layer 3 is formed such that an edge portion 7 of the first metal layer 2 protrudes beyond an edge portion 8 of the second metal layer 3 and the insulating layer 4 is set back from the edge portions 7, 8 of the first metal layer 2 and of the second metal layer 3 (see FIG. 1 in this respect). Subsequently, the first tool half 9 and the second tool half 10 of the first pressing tool 5 are moved relative to one another, wherein the edge portion 7 of the first metal layer 2 and the edge portion 8 of the second metal layer 3 are formed relative to the horizontal plane HE of the insulating layer 4. In this respect, the edge portion 7 of the first metal layer 2 and the edge portion 8 of the second metal layer 3 are bent over together in one direction (arrow U1), whereas a protruding limb 11 of the edge portion 7 of the first metal layer 2 is formed counter to the forming direction (arrow U2) to afford a standing seam 12. Provided in the tool half 9 is a mold contour 13, into which the edge portion 7 and the edge portion 8 are pressed by the second tool half 10. The protruding limb 11 is formed as longer than the opening of the mold contour 13. The edge portion 8 of the second metal layer 3 terminates with its end face approximately flush with the opening-side edge of the mold contour 13.

The standing seam 12 has a folded end 14 and a free end 15. The angle α formed between the standing seam 12 and the edge portion 7 of the first metal layer 2 is smaller than or equal to (≤) 50° (see FIG. 3 in this respect). In the exemplary embodiment illustrated in FIG. 3 and serving for explanation, the angle α is approx. 45°. The free end of the edge portion 8 of the second metal layer 3 is received between the standing seam 12 and the edge portion 7 of the first metal layer 2.

The forming direction U1 corresponds to the movement direction of the first tool half 9 relative to the second tool half 10 of the first pressing tool 5. The standing seam 12 is repositioned in the opposite direction U2.

After this, the sandwich 6 is transferred to a second pressing tool 16. The second pressing tool 16 is illustrated schematically in FIG. 3 to FIG. 6. The second pressing tool 16 has an upper tool 17 and a lower tool 18. The sandwich 6, which is formed from the first metal layer 2 and the second metal layer 3 with the insulating layer 4 inserted in between and is preformed at the edge, is received between the upper tool 17 and the lower tool 18. Subsequently, the pressing tool 16 is closed, wherein the upper tool 17 and the lower tool 18 are moved toward one another. The movement of the upper tool 17 and the lower tool 18 and the forces applied in the process are indicated in FIG. 4 to FIG. 6 by the arrows F. It goes without saying that it is also possible for only the respective upper tool 17 or the lower tool 18 to be moved relative to the respective other tool.

In the pressing tool 16, the edge portion 7 of the first metal layer 2 and the edge portion 8 of the second metal layer 3 are bent back again counter to the forming direction U1 from the first manufacturing step. During this closing movement, the upper tool 17 comes into contact with the folded end 14 of the standing seam 12. It can be seen that the folded end 14 of the standing seam 12 protrudes beyond the surface extent of the first metal layer 2, the insulating layer 4 and the second metal layer 3 in the plane of the drawing toward the upper tool 17.

The folded end 14 of the standing seam 12 comes into contact with the upper tool 17. In this way, the folded end 14 is pressed downward. In this respect, the folded end 14 slides outward as per the arrow A. The edge portion 7 of the first metal layer 2 is bent downward. At the same time, the free end 15 of the standing seam 12 is moved inward as per the arrow I. During the further closing movement, the free end 15 of the standing seam 12 comes into contact with the lower tool 18. The standing seam 12 of the edge portion 7 of the first metal layer 2 is turned over and flanged around the edge portion 8 of the second metal layer 3 to afford a hem 19.

The vertical spacing between the upper side 20 of the first metal layer 2 and the upper tool 17 is indicated in FIG. 3 by Δx1. The spacing between the free end 15 of the standing seam 12 and the lower tool 18 is indicated by Δx2. The geometric design brought about by bending over the edge portions 7, 8 of the first metal layer 2 and the second metal layer 3 and also the repositioning of the protruding limb 11 of the edge portion 7 of the first metal layer 2 to afford the standing seam 12 is implemented in the first manufacturing step in such a way that, in the second pressing tool 16 during the closing movement, the folded end 14 of the standing seam 12 comes into contact with the upper tool 17 and is pressed downward thereby before the free end 15 of the standing seam 12 comes into contact with the lower tool 18. The lever arm which acts over the length of the edge portion 7 between the folded end 14 and the bending point 21 has the effect that the standing seam 12 is turned over inwardly. In this way, the flanging is effected with the formation of the hem 19 in one operation in the second pressing tool 16.

The manufacture of the heat shield 1 is effected economically in two manufacturing steps and two pressing tools 5 and 16, respectively.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A method of producing a multilayered heat shield, the method comprising:
    placing a sandwich comprising a first metal layer, a second metal layer, and an insulating layer arranged between the first and second metal layers, into a first pressing tool, wherein
        an edge portion of the first metal layer has a protruding limb that protrudes beyond an edge portion of the second metal layer, and
        the insulating layer is set back from the edge portions of the first metal layer and the second metal layer;
    forming the sandwich in the first pressing tool to form the edge portion of the first metal layer and the edge portion of the second metal layer relative to a plane of the insulating layer, wherein
        the edge portion of the first metal layer and the edge portion of the second metal layer are bent over together in a forming direction,
        the protruding limb of the edge portion of the first metal layer is repositioned counter to the forming direction to form a standing seam, and
        the standing seam has a folded end and a free end;
    transferring the formed sandwich comprising the first metal layer, the second metal layer, and the insulating layer to a second pressing tool, the second pressing tool comprising an upper tool and a lower tool which receives the formed sandwich therebetween; and
    closing the second pressing tool in a closing movement to move the upper tool and the lower tool toward one another, wherein during the closing movement,
        the upper tool comes into contact with the folded end of the standing seam before the free end of the standing seam comes into contact with the lower tool, and
        the standing seam of the edge portion of the first metal layer is flanged to form a hem around the edge portion of the second metal layer.

2. The method according to claim 1, wherein the protruding limb is repositioned in such a way that an angle formed between the standing seam and the edge portion of the first metal layer is smaller than or equal to 50° degrees.

3. The method according to claim 2, wherein, in the formed sandwich, a free end of the edge portion of the second metal layer is received between the standing seam and the edge portion of the first metal layer.

4. The method according to claim 3, wherein, during the closing movement of the second pressing tool, the folded end of the standing seam moves outward relative to the insulating layer, and the free end of the standing seam moves inward relative to the insulating layer.

5. The method according to claim 2, wherein, during the closing movement of the second pressing tool, the folded end of the standing seam moves outward relative to the insulating layer, and the free end of the standing seam moves inward relative to the insulating layer.

6. The method according to claim 1, wherein, in the formed sandwich, a free end of the edge portion of the second metal layer is received between the standing seam and the edge portion of the first metal layer.

7. The method according to claim 6, wherein, during the closing movement of the second pressing tool, the folded end of the standing seam moves outward relative to the insulating layer, and the free end of the standing seam moves inward relative to the insulating layer.

8. The method according to claim 1, wherein, during the closing movement of the second pressing tool, the folded end of the standing seam moves outward relative to the insulating layer, and the free end of the standing seam moves inward relative to the insulating layer.

9. The method according to claim 1, wherein the insulating layer comprises a heat insulating material.

10. The method according to claim 1, wherein the insulating layer comprises organic fiber paper.

11. The method according to claim 1, wherein, in said forming the sandwich, the edge portion of the first metal layer and the edge portion of the second metal layer are pressed into a mold contour of the first pressing tool, and the protruding limb is longer than an opening of the mold contour.

* * * * *